2,882,178
Patented Apr. 14, 1959

2,882,178

COMPOSITE ANTIMONY OXIDE-SILICA PIGMENT AND PROCESS OF MANUFACTURE

Edward J. Dunn, Jr., Port Washington, and Martin Kushner, Long Island City, N.Y., assignors to National Lead Company, New York, N.Y., a corporation of New Jersey No Drawing. Application January 16, 1958
Serial No. 709,206

10 Claims. (Cl. 106—303)

This invention relates to pigments and more particularly to a novel composite antimony oxide-silica pigment and a process for its manufacture.

Antimony trioxide has been known for its value in producing a flame retardant paint. However, the use of antimony trioxide was subject to several disadvantages. Its use was limited chiefly because of the high pigment volume (50% or more) needed in order to substantially reduce the volume of organic matter in the dry film to produce a flame-retardant paint. When such a paint was produced, it was found that the high pigment volume of $Sb_2O_3$ induced other unsatisfactory properties, such as poor resistance to staining and high humidity. Another reason for the high volume of antimony trioxide needed is that in the formulation of exterior paints, it is common practice to incorporate a pigment which is a basic chemical compound and capable of reacting with fatty acids. Such pigments function by reacting with acidic decomposition products of the film. These decomposition products are formed in the film binder on exposure to the weather and are associated with polymer degradation, leading to softening and liquification of the film. The pigments react with these products to form solid metallic soaps and stabilize the film, maintaining its integrity and increasing its durability. By this means, the life of an oil film can be extended much longer under normal weathering conditions, whereas the same film unpigmented or pigmented with materials chemically inert will fail much sooner. This practice however, involved using an excess of the basic chemical compound.

The use of $Sb_2O_3$ for flame retardant paints and in the formulation of exterior paints is prohibitive due to the high cost of $Sb_2O_3$. This high cost is partially due to the lower hiding power of $Sb_2O_3$ as compared with other white pigments used in exterior paints, the consequently large volume of $Sb_2O_3$ needed in exterior paints and, as previously pointed out, in flame retardant paints.

$Sb_2O_4$ is presently used as a pigment incorporated into rubber; however, $Sb_2O_4$ has not previously been successfully commercially used as a paint pigment in either exterior paints or flame retardant paints.

Silica, $SiO_2$, is used as a pigment when finely divided; however, its low refractive index gives it little hiding power. Silica also has a low tinting strength and since it has low reactivity with common paint vehicles, it contributes little to the quality of the paint and in effect, lowers the hiding power and tinting strength of the paint. Silica is most often used as a diluent or extender pigment in low-cost paints.

This invention has for its principal object the preparation of a composite antimony oxide silica pigment, having superior resistance to staining and high humidity, and being suitable and economical for use in flame retardant paints and exterior paints. Another object is to provide a pigment containing a substantial proportion of silica in chemical and/or physical combination without the normal deleterious effect of such silica content on the pigment properties. Still another object is to provide a long weathering pigment of low antimony content. Other objects and advantages will become apparent from the following more complete description and claims.

Broadly, this invention contemplates a composite antimony oxide-silica pigment consisting essentially of at least one oxide of antimony in physico-chemical combination with said silica. This invention also contemplates a process for the manufacture of a composite antimony oxide-silica pigment consisting essentially of the steps of preparing a slurry of said oxide, said silica and a caustic, deliquoring said slurry, drying the solid portion thereof, and calcining said solid portion at elevated temperatures.

In a particularly desirable embodiment, this invention contemplates a process as aforesaid, wherein said slurry contains an antimony oxide, $SiO_2$, and a caustic, the percent of caustic present being from 0.012% to 0.5%. It has been found that while the process is operable without the aid of a caustic, the addition of a caustic is preferred as the process incorporating a caustic results in a more highly coated particle, and the caustic appears to help produce the coating, although the mechanism whereby it does so is not fully understood. An amount of caustic above 0.5% results in the undesirable agglomeration of the pigment. The subsequent calcination of this mixture may be carried out at a temperature of from 450° C. to 750° C. Very little calcination takes place at temperatures substantially below 450° C., and the product is a simple mixture of antimony oxide and silica, which is not satisfactory according to this invention. At temperatures between 450° C. and 520° C., the antimony is partially oxidized to $Sb_2O_4$, so that the product is coated partly with $Sb_2O_3$ and partly with $Sb_2O_4$. If it is desired to coat the silica entirely with $Sb_2O_4$, this may be done by carrying out the calcination at temperatures above 520° C., which results in oxidation of all of the antimony to $Sb_2O_4$. A temperature of calcination substantially greater than 750° C. for the silica coated-antimony tetraoxide, often produces a partially sintered product which is gritty in character. The period of calcination may vary from ½ to 3 hours. Below ½ hour, an incompletely calcined product is obtained. There is not any advantage to be gained under these reaction conditions from employing a calcination time of more than three hours. The preferred period of calcination is one hour. Batches calcined under these preferred conditions are whiter and softer and are not gritty. The proportion of antimony oxide to silica may vary over a wide range of from 20% to 80% for an amount of silica from 20% to 80%. These proportions are operable so that the entire range of one is operable with the entire range of the other, the sum totaling substantially 100%. It is preferred however, to have approximately equal proportions of the silica and the antimony oxide as these amounts produce a more durable coating. The desired thickness of the coating may be varied according to the needs and wants of the consumer. If, for example, it is desired to produce a pigment containing a greater weight of silica than of the antimony oxide, more than 50% of silica would be used, and less than 50% of the antimony oxide would be used. It is preferred, however to use equal amounts of silica and of the antimony oxide as these amounts produce a more durable coating.

In order to more fully illustrate the nature of this invention and the manner of practising the same, the following examples are presented:

Example I 1,400 grams of $SiO_2$, 1,400 grams of $Sb_2O_3$, 2,000 ml. of water, and 0.3% of KOH were ground together in a 4 gallon ball mill for 16 hours at room temperature. The slurry was filtered and dried, and the solid was calcined at 600° C. to 650° C. for one hour.

The product was a soft white powder and gave the following analysis:

| | Percent |
|---|---|
| $SiO_2$ | 50.50 |
| $Sb_2O_4$ | 49.45 |
| KOH | 0.05 | substantially no free silica was found. $Sb_2O_3=0.00\%$.

The same procedure was repeated without the use of a caustic. The dry product was not quite as soft or white as in the first example. Microscopic examination showed that the pigment produced was not as highly coated as in the first example in that the antimony tetraoxide in the first example was more greatly associated with the silica, than the antimony tetraoxide of this preparation.

*Example II*

The procedure of Example I was repeated, but the calcination was carried out at a temperature from 475° C. to 490° C. The dry product was a soft white powder and gave the following analysis:

| | Percent |
|---|---|
| $SiO_2$ | 50.50 |
| $Sb_2O_3$ | 15 |
| $Sb_2O_4$ | 34.44 |
| KOH | 0.06 |

The flame retardant properties of the silica coated-antimony tetraoxide, and of the silica coated-antimony tetraoxide-antimony trioxide were determined. The controls used were uncoated antimony trioxide and antimony tetraoxide. The method used to determine the flame retardant properties was the method described in Federal Specification TT–P–26a, January 13, 1954. The flame retardancy of the paints prepared with silica coated-antimony tetraoxide and silica coated antimony tetraoxide-antimony trioxide were found to compare favorably to or was better than that of the antimony trioxide and of the antimony tetraoxide.

The novel process of this invention, in particular the use of a caustic, results in new and novel antimony oxide-silica pigments with flame retardant properties, with a higher resistance to staining and high humidity, and particularly in the case of $Sb_2O_4$, in an economical, commercial pigment. These antimony oxide-silica pigments are more economical to produce and consequently are more economical for the consumer to use. The novel use of a caustic as an integral part of the process is preferred. With the caustic, as has been shown, an even more highly coated, silica coated-antimony oxide pigment is produced.

The antimony oxide-silica pigments produced exhibit improved pigment properties over an ordinary antimony oxide pigment. The durability of the antimony oxide-silica pigments is far greater than the ordinary antimony oxide pigment. The method itself is a simple one and can readily be carried out by an operator without special skill or training.

While this invention has been described in terms of certain preferred embodiments and illustrated by means of specific examples, these are illustrative only, and the invention is not to be construed as limited except as set forth in the following claims.

We claim:

1. A composite antimony oxide-silica pigment consisting essentially of at least one oxide of antimony in combination with said silica, said antimony oxide substantially coating said silica.

2. A composite antimony oxide-silica pigment according to claim 1, the proportion of said oxide present being from 20% to 80%, the proportion of said silica present being from 80% to 20%, by weight based on the sum of said antimony oxide and said silica.

3. A composite antimony oxide-silica pigment according to claim 1, in which said antimony oxide consists essentially of $Sb_2O_4$.

4. A composite antimony oxide-silica pigment according to claim 1, in which said antimony oxide consists essentially of $Sb_2O_3$.

5. A composite antimony oxide-silica pigment according to claim 1, in which said antimony oxide consists essentially of a combination of $Sb_2O_3$ and $Sb_2O_4$.

6. A composite antimony oxide-silica pigment according to claim 1, said pigment having flame retardant properties.

7. A process for the manufacture of a composite antimony oxide-silica pigment consisting essentially of the steps of preparing a slurry of antimony oxide, silica and a caustic, deliquoring said slurry, drying the solid portion thereof, and calcining said solid portion at elevated temperature.

8. A process for the manufacture of a composite antimony oxide-silica pigment according to claim 7, wherein said caustic is present by weight of said antimony oxide and silica in proportions of from 0.012% to 0.5%.

9. A process for the manufacture of a composite antimony oxide-silica pigment according to claim 7, wherein said elevated temperature is from 450° C. to 750° C.

10. A process for the manufacture of a composite antimony oxide-silica pigment consisting essentially of the steps of preparing a slurry of antimony oxide and silica, deliquoring said slurry, and calcining the solid portion thereof at elevated temperature, said elevated temperature being above 450° C.

References Cited in the file of this patent
UNITED STATES PATENTS

| 2,347,496 | Muskat et al. | Apr. 25, 1944 |
| 2,680,105 | Baker | June 1, 1954 |